United States Patent
Shiga et al.

(10) Patent No.: US 11,686,587 B2
(45) Date of Patent: *Jun. 27, 2023

(54) DRIVING SUPPORT APPARATUS, DRIVING SUPPORT SYSTEM, AND DRIVING SUPPORT METHOD

(71) Applicant: TOYOTA JIDOSHA KABUSHIKI KAISHA, Toyota (JP)

(72) Inventors: Takahiro Shiga, Chiryu (JP); Mami Kato, Toyota (JP); Masato Endo, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/538,156

(22) Filed: Nov. 30, 2021

(65) Prior Publication Data

US 2022/0090926 A1    Mar. 24, 2022

Related U.S. Application Data (63) Continuation of application No. 17/514,802, filed on Oct. 29, 2021, which is a continuation of application
(Continued)

(30) Foreign Application Priority Data

Oct. 5, 2018  (JP) ................. 2018-190179

(51) Int. Cl.
  *G01C 21/00*    (2006.01)
  *G01C 21/34*    (2006.01)
  (Continued)

(52) U.S. Cl.
  CPC ......... *G01C 21/3438* (2013.01); *B60W 30/00* (2013.01); *G01C 21/265* (2013.01); *H04W 4/48* (2018.02)

(58) Field of Classification Search
  CPC .............. G01C 21/265; G01C 21/3438; G01C 21/3605; H04W 4/40; H04W 4/48; B60W 30/00; G08G 1/202
  See application file for complete search history.

(56) References Cited

U.S. PATENT DOCUMENTS

| | | |
|---|---|---|
| 10,127,795 B1 | 11/2018 | Hwang et al. |
| 2011/0275358 A1 | 11/2011 | Faenger |
| | (Continued) | |

FOREIGN PATENT DOCUMENTS

| | | |
|---|---|---|
| CN | 107873098 A | 4/2018 |
| JP | 2013-191053 A | 9/2013 |
| JP | 2019-152613 A | 9/2019 |

OTHER PUBLICATIONS

Oct. 5, 2022 Office Action issued in U.S. Appl. No. 17/514,802.
(Continued)

*Primary Examiner* — Tyler J Lee
*Assistant Examiner* — Yufeng Zhang
(74) *Attorney, Agent, or Firm* — Oliff PLC (57) ABSTRACT

A driving support apparatus that includes a communication device configured to communicate with a vehicle-mounted device installed in a vehicle that is under automatic driving control and a mobile terminal of a user of the vehicle, and a processor configured to send, upon receiving a return request for moving the vehicle to an exit location at which the user has exited the vehicle, from the mobile terminal through the communication device, a return command for moving the vehicle to the exit location to the vehicle-mounted device through the communication device, when a return time required to move the vehicle to the exit location is less than an available return time, the available return time being calculated based on an expected arrival time at which
(Continued)

the vehicle is expected to arrive at a destination of a passenger different from the user.

11 Claims, 8 Drawing Sheets

Related U.S. Application Data

No. 16/531,187, filed on Aug. 5, 2019, now Pat. No. 11,248,919.

(51) Int. Cl.
*G01C 21/26* (2006.01)
*H04W 4/48* (2018.01)
*B60W 30/00* (2006.01)

(56) References Cited

U.S. PATENT DOCUMENTS

| | | |
|---|---|---|
| 2016/0180682 A1 | 6/2016 | McKalip et al. |
| 2016/0332535 A1 | 11/2016 | Bradley et al. |
| 2017/0270796 A1 | 9/2017 | Kawagishi |
| 2018/0065504 A1 | 3/2018 | Lan et al. |
| 2018/0174264 A1 | 6/2018 | Stock et al. |
| 2019/0279119 A1 | 9/2019 | Hirose et al. |
| 2019/0342739 A1 | 11/2019 | Shah et al. |
| 2020/0175558 A1 | 6/2020 | Fujimoto et al. |
| 2020/0258018 A1 | 8/2020 | Brady |
| 2021/0082287 A1 | 3/2021 | Hilgers et al. |

OTHER PUBLICATIONS

Toyota Motor Corporation; "Mobility Service-specific EV 'e-Palette Concept'"; Jan. 8, 2018, https://newsroom.toyota.co.jp/jp/corporate/20508200.html >.

May 11, 2021 Office Action Issued in U.S. Appl. No. 16/531,187.

Oct. 15, 2021, Notice of Allowance Issued in U.S. Appl. No. 16/531,187.

Feb. 8, 2023 Notice Of Allowance issued in U.S. Appl. No. 17/514,802.

DRIVING SUPPORT APPARATUS, DRIVING SUPPORT SYSTEM, AND DRIVING SUPPORT METHOD

This is a Continuation of U.S. application Ser. No. 17/514,802 filed on Oct. 29, 2021, which is a Continuation of U.S. application Ser. No. 16/531,187 filed on Aug. 5, 2019, which claims the benefit of Japanese Patent Application No. 2018-190179 filed on Oct. 5, 2018. The disclosure of the prior applications is hereby incorporated by reference herein in its entirety.

FIELD

The present invention relates to a driving support apparatus, a driving support system, and a driving support method.

BACKGROUND

In recent years, automatic driving technologies have been developed with the aim of realizing mobility services such as taxi, bus, and ride sharing services using automatic driving vehicles that are driven by automatic control.

For example, a non-patent literature (TOYOTA MOTOR CORPORATION, Mobility Service-specific EV "e-Palette Concept" [retrieved on Aug. 31, 2018], Internet <URL: https://newsroom.toyota.co.jp/jp/corporate/20508200.html>) discloses a vehicle control I/F (interface) for controlling a vehicle, and describes a vehicle that enables a manufacturer other than the maker of the vehicle to develop an automatic driving kit including software for automatic driving control of the vehicle. Since the automatic driving kit is configured to be replaceable or updatable, the automatic driving control can be optimized in conformance with Mobility-as-a-Service (MaaS) in the fields of movement, logistics, product sales, and the like.

Although automatic driving vehicles have the advantage that crew members such as drivers are unnecessary, automatic driving vehicles also have the disadvantage that, for example, if a user exits the vehicle leaving behind belongings, there are no crew members to find such belongings and inform the user as such. In the technology described in Japanese Patent Publication (Kokai) No. 2013-191053, for example, the current state of the interior of a vehicle is captured as current video data, and the current video data is compared with comparison video data stored in advance. When any difference is detected therebetween, a change of the interior of the vehicle is inspected, and a predetermined message is sent to the interior of the vehicle based on the difference, in order to warn a user to take his or her belongings.

SUMMARY

However, in the technology described in Japanese Patent Publication (Kokai) No. 2013-191053, when the user has exited the vehicle in a hurry, the user may be unaware of the warning about the belongings. In taxi, bus, and ride sharing services and the like in which a plurality of users ride in a vehicle, it is difficult to distinguish between personal belongings left by a user who has exited the vehicle and personal belongings of passengers remaining in the vehicle. Therefore, there is a problem that significant time is necessary for a user to retrieve his or her belongings left behind in the vehicle via a lost-and-found office or the like.

The present invention aims to provide a driving support apparatus that can enable the return of a vehicle to an exit location at which a user has exited the vehicle.

A driving support apparatus according to an embodiment of the present invention includes a communication device configured to be able to communicate with a vehicle-mounted device installed in a vehicle that is under automatic driving control and a mobile terminal of a user of the vehicle; and a processor configured to send, upon receiving a return request for moving the vehicle to an exit location at which the user has exited the vehicle, from the mobile terminal through the communication device, a return command for moving the vehicle to the exit location to the vehicle-mounted device through the communication device, when a return time required to move the vehicle to the exit location is less than an available return time.

In the driving support apparatus, the return time is preferably calculated in accordance with an elapsed time from the exit of the user from the vehicle.

The driving support apparatus preferably further includes a memory that stores a destination and a target arrival time of a passenger riding in the vehicle. The processor preferably calculates an expected arrival time at which the vehicle is expected to arrive at the destination of the passenger based on a driving route of the vehicle, and determines the available return time in accordance with an allowable time between the expected arrival time and the target arrival time.

In the driving support apparatus, upon detecting that the user has exited the vehicle, the processor preferably sends a signal for displaying a return button for sending the return request on the mobile terminal, to the mobile terminal through the communication device.

In the driving support apparatus, the signal for displaying the return button on the mobile terminal preferably further displays an available time remaining of the return button on the mobile terminal.

In the driving support apparatus, when the return time is equal to or greater than the available return time, the processor preferably retrieves a second vehicle that is present within a certain range from the exit location, and sends a command for moving the retrieved second vehicle to the exit location to the vehicle-mounted device of the second vehicle through the communication device.

A driving support system according to an embodiment of the present invention includes a vehicle-mounted device installed in a vehicle that is under automatic driving control, a mobile terminal of a user of the vehicle, and a server connected to the vehicle-mounted device and the mobile terminal, which are communicatable with each other through a network. The mobile terminal sends a return request for moving the vehicle to an exit location at which the user has exited the vehicle, to the server. Upon receiving the return request, the server sends a return command for moving the vehicle to the exit location to the vehicle-mounted device, when a return time required to move the vehicle to the exit location is less than an available return time. Upon receiving the return command, the vehicle-mounted device moves the vehicle to the exit location.

In the driving support system, the mobile terminal is preferably connected to the vehicle-mounted device, which are communicatable with each other, and sends the return command to the vehicle-mounted device.

A driving support method according to an embodiment of the present invention includes the steps of, through a communication device that is configured to be able to communicate with a vehicle-mounted device installed in a vehicle that is under automatic driving control and a mobile terminal of a user of the vehicle, receiving a return request for moving the vehicle to an exit location at which the user has exited the vehicle, from the mobile terminal; and thereafter, when a return time required to move the vehicle to the exit location is less than an available return time, sending a return command for moving the vehicle to the exit location to the vehicle-mounted device.

The object and advantages of the invention will be realized and attained by means of the elements and combinations particularly pointed out in the claims. It is to be understood that both the foregoing general description and the following detailed description are exemplary and explanatory, and are not restrictive of the invention, as claimed.

DESCRIPTION OF EMBODIMENTS

A driving support apparatus according to the present invention includes a communication device that is configured to be able to communicate with a vehicle-mounted device installed in a vehicle that is under automatic driving control and a mobile terminal of a user of the vehicle. The driving support apparatus receives a return request for returning the vehicle to an exit location at which the user has exited from the vehicle, from the mobile terminal through the communication device. When a return time required to return the vehicle to the exit location is less than an available return time in which the return request for the vehicle is acceptable, the driving support apparatus sends a return command for moving the vehicle to the exit location to the vehicle-mounted device through the communication device.

Therefore, the driving support apparatus according to the present invention can move the vehicle that is under the automatic driving control to the exit location of the user, to deliver the user's belongings left behind in the vehicle to the user who is waiting at the exit location.

A preferred embodiment of the present invention will be described below with reference to the drawings. Note that, the present invention is not limited to the following embodiment, but may be appropriately modified without departing from the gist thereof. In the drawings, components having the same or similar functions are assigned the same reference numerals, and descriptions thereof may be omitted or simplified.

FIRST EMBODIMENT

Figure 1:
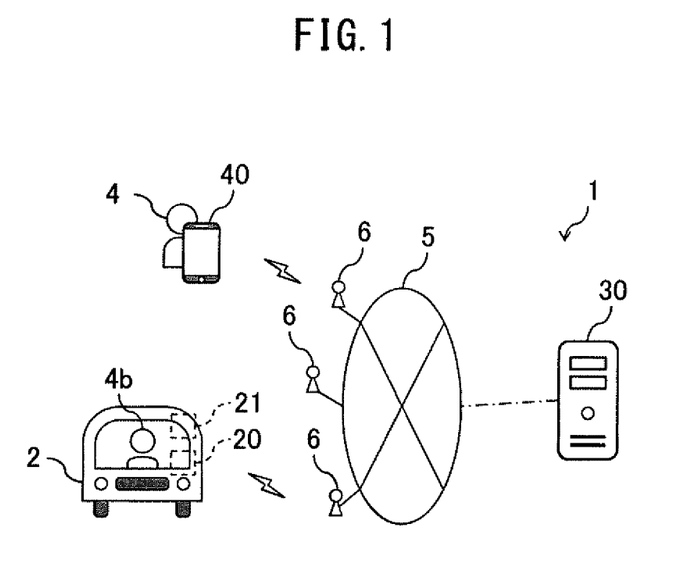
FIG. 1 is a drawing showing an example of the configuration of a driving support system according to a first embodiment.

FIG. 1 is a drawing showing an example of the configuration of a driving support system 1 according to a first embodiment. The driving support system 1 according to the present embodiment includes a vehicle-mounted device 20, a server 30, and a mobile terminal 40. The server 30 is an example of the driving support apparatus.

The vehicle 2 illustrated in FIG. 1 is an automatic driving vehicle that offers mobility services such as taxi, bus, or ride sharing services. A passenger 4b using the mobility service rides in the vehicle 2. When a passenger 4 who has moved to his or her destination using the mobility service becomes aware of left behind belongings, after he or she has exited the vehicle 2, the user operates the mobile terminal 40, such as a cellular phone or a tablet computer, to send a return request for the vehicle 2 to the server 30.

Upon receiving the return request for the vehicle 2, the server 30 sends a return command for moving the vehicle 2 to the exit location of the user 4 to the vehicle-mounted device 20 of the vehicle 2.

The vehicle-mounted device 20 and an automatic driving control module 21 are installed in the vehicle 2. When the vehicle-mounted device 20 receives the return command, the automatic driving control module 21 automatically controls the driving of the vehicle 2 to move the vehicle 2 to the exit location of the user 4.

The vehicle-mounted device 20, the server 30, and the mobile terminal 40 can communicate with each other through a network 5, which is composed of optical communication lines or the like. The server 30 is connected to the network 5 through, for example, a gateway or the like (not illustrated). The vehicle-mounted device 20 and the mobile terminal 40 are connected to the network 5 through, for example, wireless base stations 6 or the like.

Figure 2:
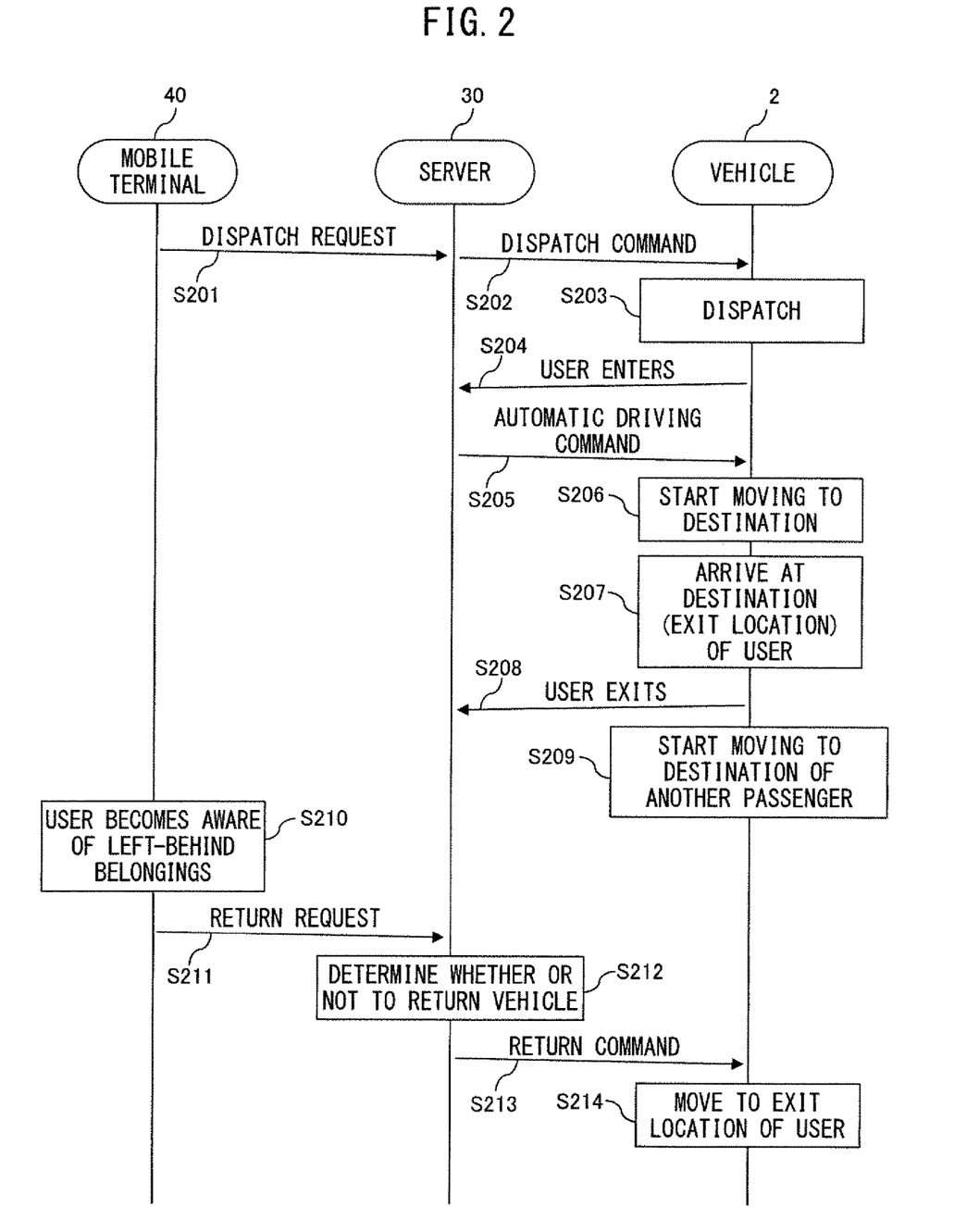
FIG. 2 is a sequence diagram showing an example of a return process of a vehicle for returning the vehicle to an exit location of a user, in the driving support system according to the first embodiment.

FIG. 2 is a sequence diagram showing an example of a return process of the vehicle 2 for returning the vehicle 2 to the exit location of the user 4, in the driving support system 1 according to the first embodiment. In the sequence diagram of FIG. 2, the server 30, the vehicle 2, and the mobile terminal 40 communicate through the network 5.

The server 30 receives information regarding the identification information, present location, destination, target arrival time, and the like of the user 4, together with a dispatch request, from the mobile terminal 40 carried by the user 4 who wishes to use a mobility service (step S201). The identification information of the user 4 is, for example, a user number assigned to the user 4 using the mobility service. The present location and destination of the user 4 are designated by, for example, facility names, addresses, or combinations of latitude and longitude.

The server 30 retrieves vehicles 2 that are present within a certain range from the present location of the user 4, and selects an available vehicle 2 from the retrieved at least one vehicle 2. The server 30 sends a dispatch command to the vehicle 2 to move the vehicle 2 to the present location of the user 4 (step S202). Note that, when the vehicle 2 offers ride sharing services or the like, other passengers 4b may already be riding in the vehicles 2. In this case, for example, the server 30 may select, from the retrieved at least one vehicle 2, a vehicle 2 containing other passengers 4b who are travelling to destinations that are in the same direction as the destination of the user 4.

When the vehicle-mounted device 20 of the vehicle 2 receives the dispatch command from the server 30, the automatic driving control module 21 automatically controls the driving of the vehicle 2 to move the vehicle 2 to the present location of the user 4, which is received together with the dispatch command (step S203).

When the user 4 enters the dispatched vehicle 2, the vehicle-mounted device 20 of the vehicle 2 detects the entry of the user 4 into the vehicle 2 by, for example, an in-vehicle camera or an opening and closing operation of a door of the vehicle 2, and informs the server 30 as such (step S204). The user 4 himself or herself, instead of the vehicle-mounted device 20 of the vehicle 2, may inform the server 30 of his or her entry into the vehicle 2 by operating the mobile terminal 40.

Upon receiving confirmation that the user 4 has entered the vehicle 2, the server 30 generates a driving route from the present location of the vehicle 2 to the destination of the user 4. Alternatively, for example, a car navigation system of the vehicle 2 may generate a driving route based on the information regarding the identification information, present location, destination, target arrival time, and the like of the user 4, which is received together with the dispatch command. Note that, when the vehicle 2 offers ride sharing services, a driving route from the present location of the vehicle 2 to the nearest destination from among the destinations of the other passengers 4b already riding in the vehicle 2 and the destination of the user 4 is generated.

The server 30 sends the driving route to the vehicle-mounted device 20 of the vehicle 2, as necessary, and commands the vehicle-mounted device 20 of the vehicle 2 to move the vehicle 2 along the driving route (step S205). Under the control of the vehicle-mounted device 20 of the vehicle 2, the automatic driving control module 21 automatically controls the driving of the vehicle 2 to move the vehicle 2 to the next destination along the driving route (step S206). While the automatic driving control module 21 is driving the vehicle 2 automatically, the vehicle-mounted device 20 of the vehicle 2 regularly sends position information representing the present location of the vehicle 2 to the server 30.

When the vehicle 2 arrives at the destination of the user 4 (step S207) and the user 4 exits the vehicle 2, the vehicle-mounted device 20 of the vehicle 2 detects the exit of the user 4 by, for example, the in-vehicle camera or an opening and closing operation of the door of the vehicle 2, and informs the server 30 as such (step S208). The user 4 himself or herself, instead of the vehicle-mounted device 20 of the vehicle 2, may inform the server 30 of his or her exit from the vehicle 2 by operating the mobile terminal 40.

Next, under the control of the vehicle-mounted device 20 of the vehicle 2, the automatic driving control module 21 automatically controls the driving of the vehicle 2, to move the vehicle 2 to the destination of the other passenger 4b (step S209).

Thereafter, when the user 4 who has exited the vehicle 2 becomes aware of his or her belongings left behind in the vehicle 2 (step S210), in the case in which the user 4 wishes to quickly retrieve the left-behind belongings, the user 4 sends a return request for moving the vehicle 2 to the exit location to the server 30, by operating the mobile terminal 40 (step S211).

Upon receiving the return request for the vehicle 2, the server 30 determines whether or not to return the vehicle 2 to the exit location of the user 4 (step S212). For example, when a return time required to move the vehicle 2 to the exit location of the user 4 is less than an available return time (for example, 1 minute), the server 30 returns the vehicle 2 to the exit location of the user 4. The return time is calculated in accordance with, for example, an elapsed time from the exit of the user 4 from the vehicle 2.

To return the vehicle 2 to the exit location of the user 4, the server 30 sends a return command for returning the vehicle 2 to the exit location of the user 4 to the vehicle-mounted device 20 of the vehicle 2 (step S213). Thereafter, the server 30 sends an expected time at which the vehicle 2 is expected to return to the exit location of the user 4 to the mobile terminal 40 of the user 4.

When the vehicle-mounted device 20 of the vehicle 2 receives the return command of the vehicle 2, the automatic driving control module 21 automatically controls the driving of the vehicle 2 to move the vehicle 2 to the exit location of the user 4, as in the case of moving the vehicle 2 to the destination of the user 4 (step S214).

Conversely, when the vehicle 2 will not return to the exit location of the user 4, the server 30 does not send a return command to the vehicle-mounted device 20 of the vehicle 2, and sends a message that the vehicle 2 cannot return to the mobile terminal 40 of the user 4. In this case, the left-behind belongings are later delivered to a lost-and-found office or the like.

Note that, when the user 4 who has become aware of the left-behind belongings does not wish to quickly retrieve the left-behind belongings, the user 4 may not send a return request for the vehicle 2 to the server 30. In this case, the left-behind belongings are later delivered to the lost-and-found office or the like.

Figure 3:
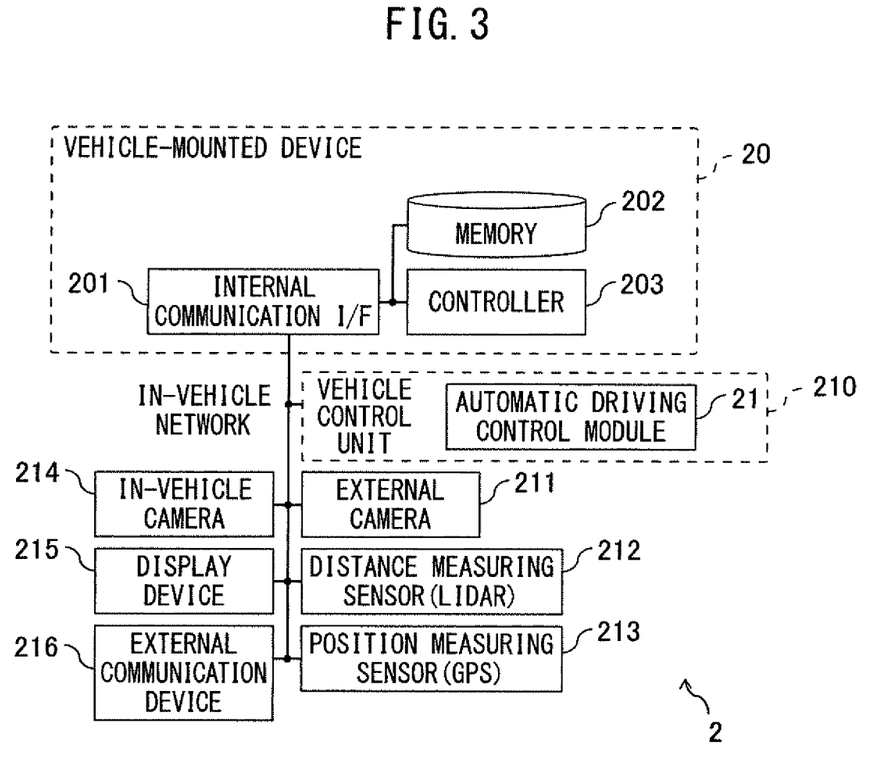
FIG. 3 is a hardware configuration diagram of the vehicle according to the first embodiment.

FIG. 3 is a hardware configuration diagram of the vehicle 2 according to the first embodiment. The vehicle 2 includes the vehicle-mounted device 20, a vehicle control unit 210, an external camera 211, a distance measuring sensor 212, a position measuring sensor 213, an in-vehicle camera 214, a display device 215, and an external communication device 216 that are connected to each other through an in-vehicle network. The vehicle 2 further includes the automatic driving control module 21. The in-vehicle network is, for example, a network that is in conformity with CAN (controller area network).

When the vehicle-mounted device 20 receives a command to return to the exit location of the user 4, the automatic driving control module 21 automatically controls the driving of the vehicle 2 to move the vehicle 2 to the exit location of the user 4. The vehicle-mounted device 20 includes an internal communication interface (I/F) 201, a memory 202, and a controller 203 that are connected to each other through signal lines.

The internal communication I/F 201 is a communication I/F circuit through which the vehicle-mounted device 20 communicates with other vehicle-mounted devices of the vehicle 2 via the in-vehicle network.

The memory 202 includes a recording medium such as an HDD (hard disk drive), an optical recording medium, or a semiconductor memory, and stores computer programs to be executed by the controller 203. The memory 202 stores data generated by the controller 203, data received by the controller 203 from the other vehicle-mounted devices of the vehicle 2 through the in-vehicle network, and the like. The memory 202 also stores information regarding the destination of the user 4, the exit location of the user 4, and the driving route of the vehicle 2, and the like received by the server 30.

The controller 203 is one or more processors and peripheral circuits thereof that execute computer programs for control and calculation in the vehicle-mounted device 20.

The automatic driving control module 21 automatically controls the driving of the vehicle 2. The automatic driving control module 21 is configured so that, for example, the performance and function of automatic driving control can be updated. Therefore, the performance and function of the automatic driving control module 21 can be optimized in accordance with the mobility service offered by the vehicle 2. Note that, in applications in which improvements in the performance and function of the automatic driving control module 21 are not particularly necessary, the automatic driving control module 21 need not necessarily be configured so as to be updatable.

The vehicle control unit 210 includes at least one automatic driving control module 21, and controls the accelerator, brake, and steering wheel of the vehicle 2 in accordance with signals outputted from the automatic driving control module 21. The vehicle control unit 210 transfers signals outputted from the external camera 211, the distance measuring sensor 212, and the position measuring sensor 213, which are described later, to the automatic driving control module 21.

The external camera 211 captures a video of objects and people around the vehicle 2, and outputs the captured video. The video captured by the external camera 211 is used by the automatic driving control module 21 to automatically control the driving of the vehicle 2. The external camera 211 is disposed near a windshield of the vehicle 2, for example, with an imaging surface thereof facing toward the outside such that the objects and people around the vehicle 2 are captured clearly.

The distance measuring sensor 212 measures and outputs distances to objects that are present ahead of the vehicle 2 on an orientation basis. Distance information measured by the distance measuring sensor 212 is used, in the same manner, by the automatic driving control module 21 to automatically control the driving of the vehicle 2. The distance measuring sensor 212 is, for example, a LIDAR (light detection and ranging) sensor installed in the vehicle 2.

The position measuring sensor 213 generates position information that represents the present location of the vehicle 2, and outputs the position information to the vehicle-mounted device 20. The position information generated by the position measuring sensor 213 is used by the automatic driving control module 21 to automatically control the driving of the vehicle 2, and is also regularly sent to the server 30 through the network 5 so that the server 30 can understand the present location of the vehicle 2. The position measuring sensor 213 is, for example, a GPS (global positioning system) of the car navigation system installed in the vehicle 2.

The in-vehicle camera 214 captures a video of people and objects in the passenger compartment of the vehicle 2, and outputs the captured video to the vehicle-mounted device 20 and the automatic driving control module 21. The video captured by the in-vehicle camera 214 is used by the vehicle-mounted device 20 and the automatic driving control module 21 to detect, for example, the entry of the user 4 into the vehicle 2 and the exit of the user 4 from the vehicle 2. A plurality of in-vehicle cameras 214 may be installed in the compartment of the vehicle 2. To clearly capture the people and objects in the compartment of the vehicle 2, the in-vehicle camera 214 is disposed, for example, on the ceiling in a front portion of the vehicle 2.

The display device 215 is controlled by the vehicle-mounted device 20. When the vehicle 2 returns to the exit location of the user 4, the display device 215 displays, for example, an announcement such as "this vehicle will return to the previous exit location by the customer's request". Instead of the display device 215, a speaker that announces the same announcement to the compartment of the vehicle 2 or the like may be used.

The external communication device 216 is an in-vehicle terminal having a wireless communication function, and is, for example, an in-vehicle navigation system or a DCM (data communication module), as described in the non-patent literature (TOYOTA MOTOR CORPORATION, Mobility Service-specific EV "e-Palette Concept" [retrieved on Aug. 31, 2018], Internet <URL: https://newsroom.toyota.cojp/jp/corporate/20508200.html>). The external communication device 216 is connected to the network 5 through the wireless base station 6, for example, by access to the wireless base station 6, which is connected to the network 5 through a gateway (not illustrated) and the like. The external communication device 216 may be configured such that the mobile terminal 40 of the user 4 can directly communicate with the vehicle-mounted device 20 of the vehicle 2 using near-field wireless communication such as, for example, Bluetooth (trademark).

Figure 4:
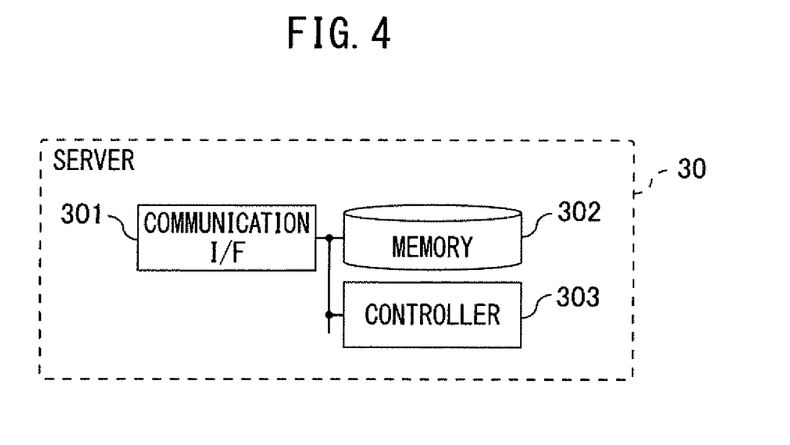
FIG. 4 is a hardware configuration diagram of a server according to the first embodiment.

FIG. 4 is a hardware configuration diagram of the server 30 according to the first embodiment. The server 30 includes a communication I/F 301, a memory 302, and a controller 303 that are connected to each other through signal lines.

The communication I/F 301, which is an example of the communication device, is a communication I/F circuit for connecting the server 30 to the network 5 through, for example, a gateway or the like. The communication I/F 301 is configured to be able to communicate with the vehicle-mounted device 20 of the vehicle 2 and the mobile terminal 40 through the network 5.

The memory 302 includes a recording medium such as an HDD (hard disk drive), an optical recording medium, or a semiconductor memory, and stores computer programs executed by the controller 303. The memory 302 stores data generated by the controller 303, data received by the controller 303 through the network 5, and the like. The memory 302 stores the information regarding the identification information, present location, destination, target arrival time, and the like of the user 4, which is received from the mobile terminal 40, information regarding the exit location of the user 4, and information regarding the driving route of the vehicle 2. The memory 302 stores the type, version, or the like of the automatic driving control module 21 of the vehicle 2, as an example of information regarding the vehicle 2. The memory 302 stores information regarding the address and the like of the user 4, as an example of information regarding the user 4, in association with the identification information of the user 4. The memory 302 may store data including the image of a return button, which is described later, to be displayed on the mobile terminal 40, the display style of a remaining available return time of the return button, and the like.

Figure 5:
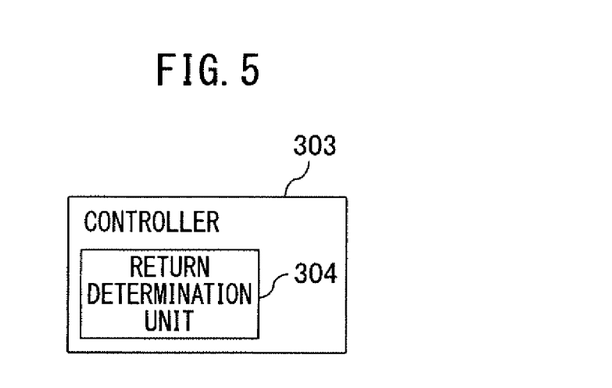
FIG. 5 is a functional block diagram of a controller of the server according to the first embodiment.

FIG. 5 is a functional block diagram of the controller 303 of the server 30 according to the first embodiment. The controller 303 is one or more processors and peripheral circuits thereof that execute computer programs for control and calculation in the server 30. The controller 303 includes a return determination unit 304. The return determination unit 304 is realized as, for example, a software module or firmware in which computer programs are written.

Upon receiving a return request for the vehicle 2 through the communication I/F 301, the return determination unit 304 sends a return command of the vehicle 2 to the vehicle-mounted device 20 through the communication I/F 301, when a return time required to return the vehicle 2 to the exit location is less than an available return time.

Figure 6:
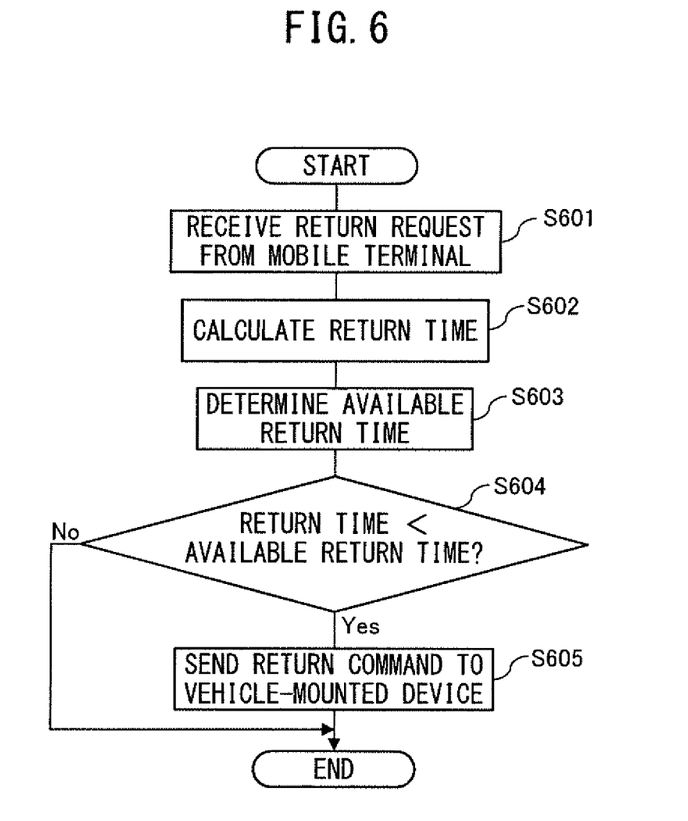
FIG. 6 is a flowchart showing an example of the return process of the vehicle for returning the vehicle to the exit location of the user, in the server according to the first embodiment.

FIG. 6 is a flowchart showing an example of the return process of the vehicle 2 for returning the vehicle 2 to the exit location of the user 4, in the server 30 according to the first embodiment. The return determination unit 304 of the server 30 carries out the return process of the vehicle 2 in accordance with the following flowchart. Descriptions regarding contents that are the same as the sequence diagram of FIG. 2 have been omitted.

Upon receiving a return request for the vehicle 2 from the mobile terminal 40 of the user 4 through the communication I/F 301 (step S601), the return determination unit 304 determines whether or not to return the vehicle 2 to the exit location of the user 4. More specifically, the return determination unit 304 first calculates a return time required to return the vehicle 2 to the exit location of the user 4 (step S602).

When the vehicle 2 can return to the exit location by moving along a driving route that the vehicle 2 has used to move from the exit location of the user 4 to the present location, in the reverse direction, the return time coincides with an elapsed time from the exit of the user 4 from the vehicle 2. Conversely, when the driving route along which the vehicle 2 has moved from the exit location to the present location includes a one-way traffic street, and the vehicle 2 cannot return to the exit location in the reverse direction, the return determination unit 304 retrieves an alternative route. The return determination unit 304 calculates a time required to move the vehicle 2 to the exit location along the alternative route as the return time. The return time may further be multiplied by predetermined adjustment coefficients representing, for example, the traffic conditions of roads, the gradients of the roads, and the like.

Next, the return determination unit 304 determines an available return time in which the return request for the vehicle 2 is acceptable, at, for example, a predetermined length of time (e.g., 1 minute) (step S603). Alternatively, the return determination unit 304 may determine the available return time based on information regarding the destinations, target arrival times, and the like of the passengers 4*b* stored in advance in the memory 302.

For example, the return determination unit 304 calculates expected arrival times of the individual passengers 4*b* at which the vehicle 2 can sequentially arrive at the destinations of the individual passengers 4*b*, along the driving route of the vehicle 2. The return determination unit 304 calculates an allowable time between the expected arrival time and the target arrival time of each passenger 4*b*, and determines half of a minimum value of the allowable times as the available return time. In this case, the available return time may sometimes be zero. The reason why the available return time is set to half of the allowable time is that, when the vehicle 2 returns to the exit location of the user 4, time to return the vehicle 2 from the exit location to the present location is necessary in actual fact, in addition to the return time to move the vehicle 2 from the present location to exit location of the user 4.

Furthermore, for example, when a dispatch request is received from another user 4, the return determination unit 304 generates a driving route to a dispatch point of the other user 4, and subtracts a dispatch time required to move the vehicle 2 to the dispatch point of the other user 4 from the available return time, as necessary.

Next, the return determination unit 304 determines whether or not the return time is less than the available return time (step S604). When the return time is less than the available return time (YES in step S604), the return determination unit 304 sends a return command to the vehicle-mounted device 20 through the communication I/F 301 to move the vehicle 2 to the exit location of the user 4 (step S605). Thereafter, the server 30 sends an expected time at which the vehicle 2 is expected to return to the exit location of the user 4 to the mobile terminal 40. Therefore, the vehicle 2 that is under the automatic driving control moves to the exit location of the user 4, and the user's belongings left behind in the vehicle 2 are delivered to the user 4 waiting at the exit location.

Conversely, when the return time is equal to or greater than the available return time (NO in step S604), the return determination unit 304 does not send a return command to the vehicle-mounted device 20, and sends a message that the vehicle 2 cannot return to the mobile terminal 40. The return determination unit 304 then ends the return process. In this case, the left-behind belongings are later delivered to a lost-and-found office or the like.

Note that, in step S602, the return determination unit 304 may calculate a return distance to move the vehicle 2 to the exit location of the user 4, instead of the return time required to move the vehicle 2 to the exit location of the user 4. In this case, the return determination unit 304 determines whether or not to return the vehicle 2 to the exit location of the user 4 in accordance with whether or not the return distance is less than a return available distance (for example, 600 m).

Figure 7:
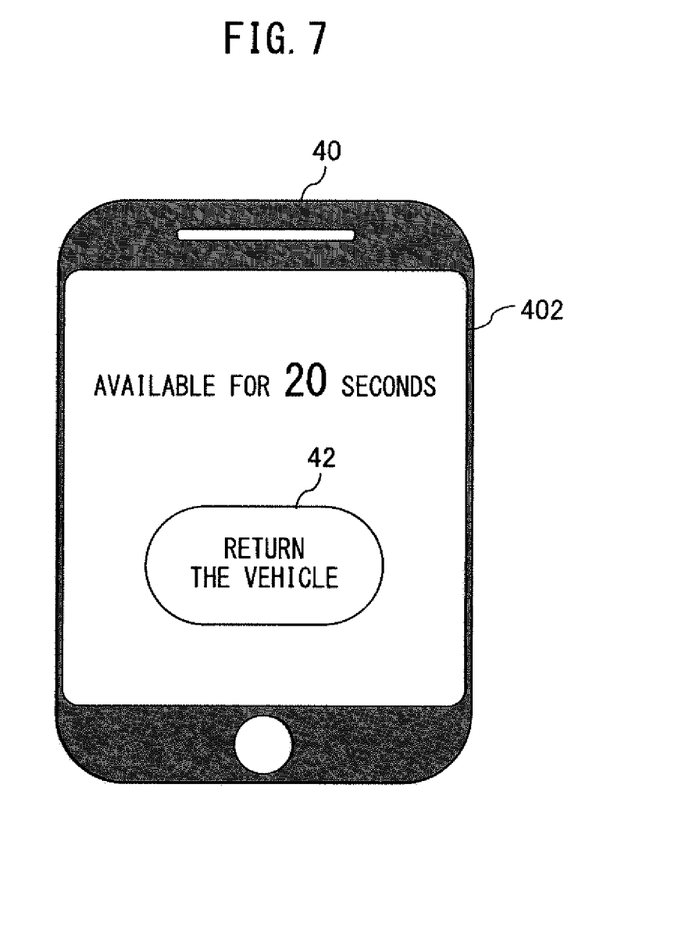
FIG. 7 is a drawing showing an example of a return button displayed on a mobile terminal according to the first embodiment.

FIG. 7 is a drawing showing an example of a return button 42 displayed on the mobile terminal 40 according to the first embodiment. The return button 42 illustrated in FIG. 7 is displayed on, for example, a touch display 402 of the mobile terminal 40 in accordance with a signal sent from the server 30. The user 4 can thereby send a return request for the vehicle 2 to the server 30 by operating the return button 42 displayed on the touch display 402.

In FIG. 7, an available time remaining of the return button 42 (20 seconds in FIG. 7) is displayed above the return button 42. The available time remaining is also displayed in accordance with a signal sent from the server 30. Therefore, the user 4 can determine whether or not to operate the return button 42, while checking the available time remaining of the return button 42 on the touch display 402.

The initial value of the available time remaining is, for example, the available return time determined in the flowchart of FIG. 6, and is counted down with a lapse of time from the exit of the user 4 from the vehicle 2. The countdown display may be updated in accordance with the signal sent from the server 30 or may be updated by the mobile terminal 40.

The signal for displaying the return button 42 sent from the server 30 may include information regarding the image of the return button 42 and the display style of the available time remaining of the return button 42. Alternatively, the information regarding the image of the return button 42 and the display style of the available time remaining thereof may be stored in advance in a memory of the mobile terminal 40. In this case, upon receiving the signal for displaying the return button 42 from the server 30, the mobile terminal 40 reads the image of the return button 42 and the display style of the available time remaining thereof from the memory, and displays the return button 42 and the available time remaining thereof on the touch display 402.

Figure 8:
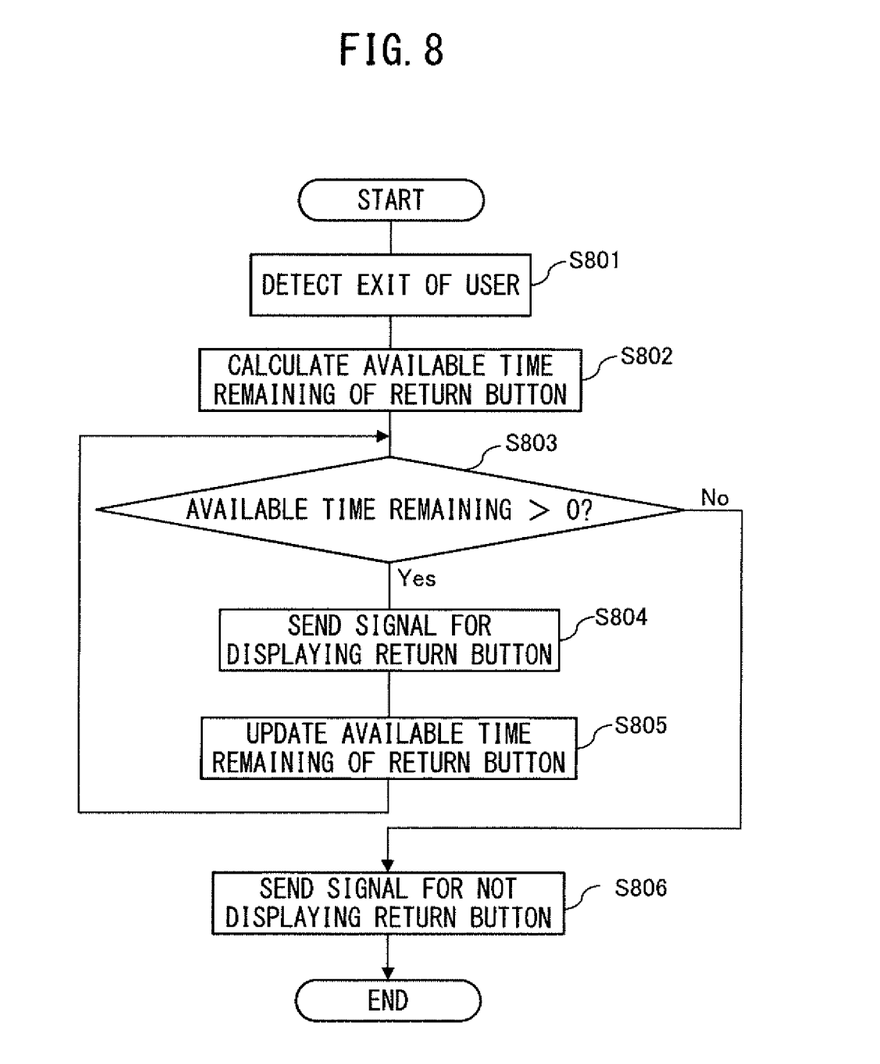
FIG. 8 is a flowchart showing an example of a return button display process for displaying the return button on the mobile terminal, in the server according to the first embodiment.

FIG. 8 is a flowchart showing an example of a return button display process for displaying the return button 42 on the mobile terminal 40, in the server 30 according to the first embodiment. The return determination unit 304 of the server 30 carries out the return button display process in accordance with the following flowchart.

When the return determination unit 304 detects the exit of the user 4 from the vehicle 2 by, for example, a notification from the vehicle 2 or the mobile terminal 40 (step S801), the return determination unit 304 calculates an initial value of an available time remaining of the return button 42 (step S802). The initial value of the available time remaining is, for example, an available return time, as described above. When the available return time is calculated based on the information regarding the destinations, target arrival times, and the like of the passengers 4b, the initial value of the available time remaining may sometimes be zero.

Next, the return determination unit 304 determines whether or not the available time remaining of the return button 42 is greater than zero (step S803). When the available time remaining of the return button 42 is greater than zero (YES in step S803), the return determination unit 304 sends a signal for displaying the return button 42 to the mobile terminal 40 through the communication I/F 301 (step S804). This signal may be sent in a data format of, for example, HTML (hypertext markup language) or the like including information regarding the image of the return button 42 and the display style of the available time remaining thereof. Therefore, the return button 42 and the available time remaining thereof are displayed on the mobile terminal 40.

The return determination unit 304 updates the value of the available time remaining of the return button 42 (step S805). The available time remaining is, for example, a time that a return time calculated by the flowchart of FIG. 6 is subtracted from the initial value of the available time remaining. Alternatively, the available time remaining may be updated by simply counting down the initial value of the available time remaining with a lapse of time from the exit of the user 4 from the vehicle 2. While the available time remaining of the return button 42 is greater than zero, the return determination unit 304 repeats steps S803 to S805 at certain control intervals. The mobile terminal 40, instead of the return determination unit 304, may perform the steps for updating and displaying the return button 42 and the available time remaining thereof.

Conversely, when the available time remaining of the return button 42 is zero (NO in step S803), the return determination unit 304 sends a signal not to display the return button 42 to the mobile terminal 40 through the communication I/F 301 (step S806). Therefore, the return button 42 and the available time remaining thereof are not displayed on the mobile terminal 40. Instead of not displaying the return button 42, the return determination unit 304 may lightly display the inoperable return button 42.

Figure 9:
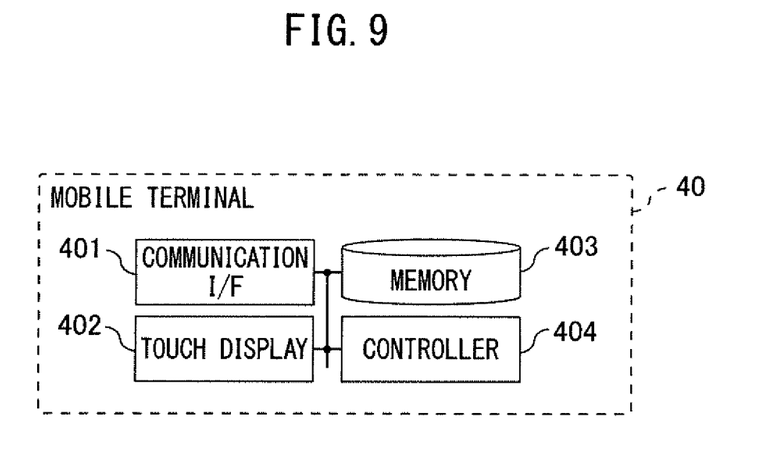
FIG. 9 is a hardware configuration diagram of the mobile terminal according to the first embodiment.

FIG. 9 is a hardware configuration diagram of the mobile terminal 40 according to the first embodiment. The mobile terminal 40 includes a communication I/F 401, a touch display 402, a memory 403, and a controller 404 that are connected to each other through signal lines.

The communication I/F 401 is a communication I/F circuit that connects the mobile terminal 40 to the network 5 through, for example, a gateway or the like. The communication I/F 401 is configured to be able to communicate with the server 30 through the network 5. The communication I/F 401 may be configured such that the mobile terminal 40 of the user 4 can directly communicate with the vehicle-mounted device 20 of the vehicle 2 using near-field wireless communication such as, for example, Bluetooth (trademark).

As illustrated in FIG. 7, the return button 42 and the available time remaining thereof are displayed on the touch display 402. The user 4 can send a return request for the vehicle 2 to the server 30 by operating the return button 42 displayed on the touch display 402.

The memory 403 includes a recording medium such as an HDD (hard disk drive), an optical recording medium, or a semiconductor memory, and stores computer programs to be executed by the controller 404. The memory 403 stores data generated by the controller 404, data received by the controller 404 through the network 5, and the like. The memory 403 may store data regarding the image of the return button 42 displayed on the touch display 402, the display style of the available time remaining of the return button 42, and the like.

The controller 404 is one or more processors and peripheral circuits thereof that execute computer programs for control and calculation in the mobile terminal 40.

As described above, the driving support apparatus according to the present embodiment includes a communication device that is configured to be able to communicate with the vehicle-mounted device installed in the vehicle that is under the automatic driving control and the mobile terminal of the user of the vehicle. The driving support apparatus receives a return request for returning the vehicle to the exit location at which the user has exited the vehicle, from the mobile terminal through the communication device. When a return time required to move the vehicle to the exit location is less than an available return time, the driving support apparatus sends a return command for moving the vehicle to the exit location to the vehicle-mounted device through the communication device.

Therefore, the driving support apparatus according to the present invention can enable delivery of the user's belongings left behind in the vehicle to the user waiting at the exit location, by moving the vehicle that is under the automatic driving control to the exit location of the user.

The above embodiment is merely a practical example of embodiment of the present invention, and the technical scope of the present invention is not limited thereby. The present invention can be carried out in various forms without departing from the technical principles or major features thereof.

According to another modification example, the external communication device 216 of the vehicle 2 may have a near-field wireless communication module in conformity with, for example, Bluetooth (trademark) or the like, so that the mobile terminal 40 of the user 4 can directly communicate with the vehicle-mounted device 20 of the vehicle 2. When no sooner has the vehicle 2 started moving to the next destination, than the user 4 who exited the vehicle 2 has become aware of his or her belongings left behind in the vehicle 2, the user 4 can send a return command to the vehicle-mounted device 20 using the near-field wireless communication module, without going through the server 30, by operating the mobile terminal 40.

According to another modification example, the driving support apparatus may command another server that manages the information regarding the user 4 to charge an additional fee to the user 4, in accordance with a return time required to return the vehicle 2 to the exit location of the user 4. Therefore, since the user 4 will attempt to send a return request to the server 30 as soon as the user 4 has become aware of left-behind belongings, in order to save the additional fee, it is possible to prevent a time delay in the arrival of the vehicle 2 to the destinations of the other passengers 4b riding in the vehicle 2.

In a case where, for example, the user 4 has prematurely exited the vehicle 2 by mistake, the user 4 may send a return request for the vehicle 2 to the server 30 by operating the mobile terminal 40, for the purpose of re-entering the vehicle 2, instead of the retrieval of left-behind belongings. In this case, when the vehicle 2 cannot return to the exit location of the user 4, the driving support apparatus may dispatch another second vehicle to the exit location of the user 4.

For example, when the return time is equal to or greater than the available return time, the driving support apparatus retrieves a second vehicle that is present within a certain range from the exit location of the user 4. The driving support apparatus sends a command for moving the retrieved second vehicle to the exit location to the vehicle-mounted device 20 of the second vehicle through the communication device. In this case, the driving support apparatus may display two buttons, i.e., a normal return button 42 for retrieval of left-behind belongings and a return button 42 for re-entry, by which another second vehicle is automatically dispatched as necessary, on the mobile terminal 40 of the user 4. The driving support apparatus according to the present invention enables a user 4 who has prematurely exited the vehicle 2 by mistake to ride in the vehicle 2 or the second vehicle.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A driving support apparatus comprising:
    a communication device configured to communicate with a vehicle-mounted device installed in a vehicle that is under automatic driving control and a mobile terminal of a user of the vehicle; and
    a processor configured to transmit, upon receiving a return request to move the vehicle to an exit location at which the user has exited the vehicle, from the mobile terminal through the communication device, a return command to move the vehicle by automatic driving control to the exit location to the vehicle-mounted device through the communication device, when a return time required to move the vehicle to the exit location is less than an available return time, the available return time being calculated based on an expected arrival time at which the vehicle is expected to arrive at a destination of a passenger different from the user.

2. The driving support apparatus according to claim 1, wherein the return time is calculated in accordance with an elapsed time from the exit of the user from the vehicle.

3. The driving support apparatus according to claim 1, further comprising:
    a memory that stores a destination and a target arrival time of the passenger riding in the vehicle, wherein
    the processor calculates the expected arrival time based on a driving route of the vehicle, and determines the available return time in accordance with an allowable time between the expected arrival time and the target arrival time.

4. The driving support apparatus according to claim 1, wherein upon detecting that the user has exited the vehicle, the processor transmits a signal to display a return button for sending the return request on the mobile terminal, to the mobile terminal through the communication device.

5. The driving support apparatus according to claim 4, wherein the signal to display the return button on the mobile terminal further displays an available time remaining of the return button on the mobile terminal.

6. The driving support apparatus according to claim 2, wherein when the return time is equal to or greater than the available return time, the processor retrieves a second vehicle that is present within a certain range from the exit location, and transmits a command to move the retrieved second vehicle to the exit location to the vehicle-mounted device of the second vehicle through the communication device.

7. A driving support system comprising:
    a vehicle-mounted device installed in a vehicle that is under automatic driving control;
    a mobile terminal of a user of the vehicle; and
    a server connected to the vehicle-mounted device and the mobile terminal, which are communicable with each other through a network, wherein:
        the mobile terminal transmits, to the server, a return request to move the vehicle to an exit location at which the user has exited the vehicle,
        upon receiving the return request, the server transmits, to the vehicle-mounted device, a return command to move the vehicle to the exit location, when a return time required to move the vehicle to the exit location is less than an available return time, the available return time being calculated based on an expected arrival time at which the vehicle is expected to arrive at a destination of a passenger different from the user, and
        upon receiving the return command, the vehicle-mounted device moves the vehicle by automatic driving control to the exit location.

8. The driving support system according to claim 7, wherein the mobile terminal is connected to the vehicle-mounted device, which are communicable with each other, and transmits the return command to the vehicle-mounted device.

9. A driving support method comprising steps of:
    through a communication device that is configured to communicate with a vehicle-mounted device installed in a vehicle that is under automatic driving control and a mobile terminal of a user of the vehicle, receiving a return request to move the vehicle to an exit location at which the user has exited the vehicle, from the mobile terminal; and thereafter
    transmitting, to the vehicle-mounted device, a return command to move the vehicle by automatic driving control to the exit location, when a return time required to move the vehicle to the exit location is less than an available return time, the available return time being calculated based on an expected arrival time at which the vehicle is expected to arrive at the destination of a passenger different from the user.

10. The driving support apparatus according to claim 1, wherein when the vehicle will not return to the exit location of the user, the processor transmits to the mobile terminal of the user a message that the vehicle cannot return to the exit location.

11. The driving support apparatus according to claim 1, wherein the processor transmits to the mobile terminal a signal to display a return button, via which the user transmits the return command, and an available time remaining of the return button on a display of the mobile terminal.

\* \* \* \* \*